(12) United States Patent
Maity et al.

(10) Patent No.: US 9,479,265 B2
(45) Date of Patent: Oct. 25, 2016

(54) SYSTEM AND METHOD FOR HIGH SPEED AND EFFICIENT VIRTUAL DESKTOP INSFRASTRUCTURE USING PHOTONICS

(71) Applicant: AMERICAN MEGATRENDS, INC., Norcross, GA (US)

(72) Inventors: Sanjoy Maity, Snellville, GA (US); Varadachari Sudan Ayanam, Suwanee, GA (US); Joseprabu Inbaraj, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 107 days.

(21) Appl. No.: 14/623,303

(22) Filed: Feb. 16, 2015

(65) Prior Publication Data

US 2016/0241345 A1   Aug. 18, 2016

(51) Int. Cl.
| | |
|---|---|
| H04B 10/00 | (2013.01) |
| H04B 10/80 | (2013.01) |
| G06F 13/42 | (2006.01) |
| G06F 3/06 | (2006.01) |

(52) U.S. Cl.
CPC ........... *H04B 10/801* (2013.01); *G06F 3/0619* (2013.01); *G06F 3/0655* (2013.01); *G06F 3/0665* (2013.01); *G06F 3/0685* (2013.01); *G06F 13/4282* (2013.01)

(58) Field of Classification Search
CPC . H04B 10/801; G06F 3/0655; G06F 3/0619; G06F 3/0665; G06F 13/4282; G06F 3/0685
USPC ........................................................ 398/140
See application file for complete search history.

(56) References Cited

U.S. PATENT DOCUMENTS

| | | | | |
|---|---|---|---|---|
| 2009/0049174 | A1* | 2/2009 | Rudnik | G06F 9/44505 709/226 |
| 2009/0089522 | A1* | 4/2009 | Kulkarni | G06F 11/1464 711/162 |
| 2010/0275198 | A1* | 10/2010 | Jess | G06F 11/1484 718/1 |
| 2011/0078432 | A1* | 3/2011 | Wu | G06F 9/4403 713/2 |
| 2011/0185355 | A1* | 7/2011 | Chawla | G06F 9/5077 718/1 |
| 2012/0076197 | A1* | 3/2012 | Byford | H04N 19/00 375/240.01 |
| 2012/0127173 | A1* | 5/2012 | Elliott Swift | G06T 15/005 345/419 |
| 2012/0173755 | A1* | 7/2012 | Margulis | G06F 3/14 709/231 |
| 2012/0317544 | A1* | 12/2012 | Komatsuzaki | G06F 17/30864 717/106 |
| 2013/0013865 | A1* | 1/2013 | Venkatesh | G06F 17/30132 711/133 |
| 2014/0189204 | A1* | 7/2014 | Sugimoto | G06F 3/061 711/103 |
| 2014/0229440 | A1* | 8/2014 | Venkatesh | G06F 17/30174 707/634 |
| 2016/0156999 | A1* | 6/2016 | Liboiron-Ladouceur | H04Q 11/0005 398/51 |

* cited by examiner

*Primary Examiner* — Juan A Torres
(74) *Attorney, Agent, or Firm* — Locke Lord LLP; Tim Tingkang Xia, Esq.

(57) ABSTRACT

A system includes a virtual desktop server having a first processor and a photonics module. The photonics module includes a photonics interface connected to the first processor and connected to a photonics device via an optical channel, and a photonics controller having a second processor and a memory storing computer executable code. The code, when executed at the second processor, is configured to: control the photonics interface to receive first electronic signals from the first processor; convert the received first electronic signals to first optical signals; control the photonics interface to transmit the first optical signals to the photonics device via the optical channel; control the photonics interface to receive second optical signals from the photonics device via the optical channel; convert the received second optical signals to second electronic signals; and control the photonics interface to transmit the second electronic signals to the first processor.

27 Claims, 4 Drawing Sheets

SYSTEM AND METHOD FOR HIGH SPEED AND EFFICIENT VIRTUAL DESKTOP INSFRASTRUCTURE USING PHOTONICS

FIELD

The present disclosure relates generally to virtual desktop infrastructure (VDI), and more particularly to systems and methods for providing high speed and efficient VDI using photonics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, in a VDI system, a disk storage device is used to store virtual machine (VM) images and other data such as user profiles. However, disk access is slow especially while boot storm when multiple users attempt to simultaneously access to the VMs. Moreover, the conventional system buses and other data input/output (I/O) interfaces used for data transfer also become bottlenecks and limit data access speed.

Therefore, an unaddressed need exists in the art to address the aforementioned deficiencies and inadequacies.

SUMMARY

In one aspect, the present disclosure relates to a system. The system includes a virtual desktop server, the virtual desktop server includes a first processor and a photonics module. The photonics module includes a photonics interface and a photonics controller. The photonics interface is configured to be electronically connected to the first processor, and to be connected to at least one photonics device via an optical channel. The photonics controller includes a second processor and a non-volatile memory storing first computer executable code. The first computer executable code, when executed at the second processor, is configured to:

control the photonics interface to receive first electronic signals from the first processor;

convert the received first electronic signals to first optical signals;

control the photonics interface to transmit the first optical signals to the at least one photonics device via the optical channel;

control the photonics interface to receive second optical signals from the at least one photonics device via the optical channel;

convert the received second optical signals to second electronic signals; and control the photonics interface to transmit the second electronic signals to the first processor.

In one embodiment, the first computer executable code includes:

a processing module configured to convert the received first electronic signals to the first optical signals and convert the received second optical signals to the second electronic signals; and a transceiver module configured to control the photonics interface to receive the first electronic signals from the first processor, to receive the second optical signals from the at least one photonics device via the optical channel, to transmit the first optical signals to the at least one photonics device via the optical channel, and to transmit the second electronic signals to the first processor.

In one embodiment, the photonics module is a chip having the photonics interface and the photonics controller integrated therein.

In one embodiment, the photonics interface is electronically connected to the first processor through a peripheral component interconnect express (PCIe) bus.

In one embodiment, the optical channel includes at least one photonics channel, and the photonics interface is electronically connected to the at least one photonics channel through a photonics bus.

In one embodiment, the photonics interface includes:

a first input/output (I/O) port electronically connected with the first processor;

a second I/O port connected with the at least one photonics device;

a first transceiver connected with the first I/O port, configured to receive the first electronic signals from and transmit the second electronic signals to the first processor via the first I/O port;

a second transceiver connected with the second I/O port, configured to receive the second optical signals from and transmit the first optical signals to the at least one photonics device via the optical channel; and a signal converter connected between the first transceiver and the second transceiver, configured to convert the first electronic signals received from the first transceiver to the first optical signals and convert the second optical signals received from the second transceiver to the second electronic signals.

In one embodiment, the virtual desktop server further includes a chassis, the first processor and the photonics module are physically disposed in the chassis, and the at least one photonics device is physically disposed outside the chassis.

In one embodiment, the at least one photonics device includes at least one of a non-volatile memory, a volatile memory, a storage device, and a graphic processor unit of the virtual desktop server.

In one embodiment, the at least one photonics device includes a server of the system.

In one embodiment, the virtual desktop server further includes a memory and a storage storing second computer executable code, and the second computer executable code, when executed at the first processor, is configured to:

allocate a portion of the storage to create a data store for preserving data from a plurality of virtual machines (VMs); and allocate a portion of the memory to create a random access memory (RAM) disk for hosting the plurality of VMs and writing through the data from the plurality of VMs to the data store.

In one embodiment, the storage of the virtual desktop server further stores a hypervisor and a persistent copy of the plurality of VMs, wherein the virtual desktop server is configured to:

execute the hypervisor;

copy the VMs from the persistent copy to the RAM disk; and execute the VMs on the executed hypervisor, wherein each of the executed VMs is configured to provide one or more virtual desktops accessible for a plurality of computing devices functioning as a plurality of thin clients.

In another aspect, the present disclosure relates to a method. The method includes:

controlling, by a photonics controller of a virtual desktop server, a photonics interface of the virtual desktop server to receive first electronic signals from a first processor of the virtual desktop server, wherein the photonics interface is configured to be electronically connected to the first processor and at least one photonics device via an optical channel;

converting, by the photonics controller, the received first electronic signals to first optical signals;

controlling, by the photonics controller, the photonics interface to transmit the first optical signals to the at least one photonics device via the optical channel;

controlling, by the photonics controller, the photonics interface to receive second optical signals from the at least one photonics device via the optical channel;

converting, by the photonics controller, the received second optical signals to second electronic signals; and controlling, by the photonics controller, the photonics interface to transmit the second electronic signals to the first processor.

In one embodiment, the virtual desktop server includes a photonics module, and wherein the photonics module is a chip having the photonics interface and the photonics controller integrated therein.

In one embodiment, the photonics interface is electronically connected to the first processor through a peripheral component interconnect express (PCIe) bus.

In one embodiment, the optical channel is at least one photonics channel, and the photonics interface is electronically connected to the at least one photonics channel through a photonics bus.

In one embodiment, the photonics interface includes:

a first input/output (I/O) port electronically connected with the first processor;

a second I/O port connected with the at least one photonics device;

a first transceiver connected with the first I/O port, configured to receive the first electronic signals from and transmit the second electronic signals to the first processor via the first I/O port;

a second transceiver connected with the second I/O port, configured to receive the second optical signals from and transmit the first optical signals to the at least one photonics device via the optical channel; and a signal converter connected between the first transceiver and the second transceiver, configured to convert the first electronic signals received from the first transceiver to the first optical signals and convert the second optical signals received from the second transceiver to the second electronic signals.

In one embodiment, the virtual desktop server further includes a chassis, the first processor and the photonics module are physically disposed in the chassis, and the at least one photonics device is physically disposed outside the chassis.

In one embodiment, the at least one photonics device includes at least one of a non-volatile memory, a volatile memory, a storage device, and a graphic processor unit of the virtual desktop server.

In one embodiment, the at least one photonics device includes a server of the system.

In a further aspect, the present disclosure relates to a non-transitory computer readable medium storing computer executable code. The code, when executed at a processor of a photonics controller of a virtual desktop server of a system, is configured to:

control a photonics interface of the virtual desktop server to receive first electronic signals from a processor of the virtual desktop server, wherein the photonics interface is configured to be connected to the processor of the virtual desktop server and at least one photonics device via an optical channel;

convert the received first electronic signals to first optical signals;

control the photonics interface to transmit the first optical signals to the at least one photonics device via the optical channel;

control the photonics interface to receive second optical signals from the at least one photonics device via the optical channel;

convert the received second optical signals to second electronic signals; and control the photonics interface to transmit the second electronic signals to the processor of the virtual desktop server.

In one embodiment, the virtual desktop server includes a photonics module, and wherein the photonics module is a chip having the photonics interface and the photonics controller integrated therein.

In one embodiment, the photonics interface is electronically connected to the processor of the virtual desktop server through a peripheral component interconnect express (PCIe) bus.

In one embodiment, the optical channel is at least one photonics channel, and the photonics interface is electronically connected to the at least one photonics channel through a photonics bus.

In one embodiment, the photonics interface includes:

a first input/output (I/O) port electronically connected with the processor of the virtual desktop server;

a second I/O port connected with the at least one photonics device;

a first transceiver connected with the first I/O port, configured to receive the first electronic signals from and transmit the second electronic signals to the processor of the virtual desktop server via the first I/O port;

a second transceiver connected with the second I/O port, configured to receive the second optical signals from and transmit the first optical signals to the at least one photonics device via the optical channel; and a signal converter connected between the first transceiver and the second transceiver, configured to convert the first electronic signals received from the first transceiver to the first optical signals and convert the second optical signals received from the second transceiver to the second electronic signals.

In one embodiment, the virtual desktop server further includes a chassis, the processor of the virtual desktop server and the photonics module are physically disposed in the chassis, and the at least one photonics device is physically disposed outside the chassis.

In one embodiment, the at least one photonics device includes at least one of a non-volatile memory, a volatile memory, a storage device, and a graphic processor unit of the virtual desktop server.

In one embodiment, the at least one photonics device includes a server of the system.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
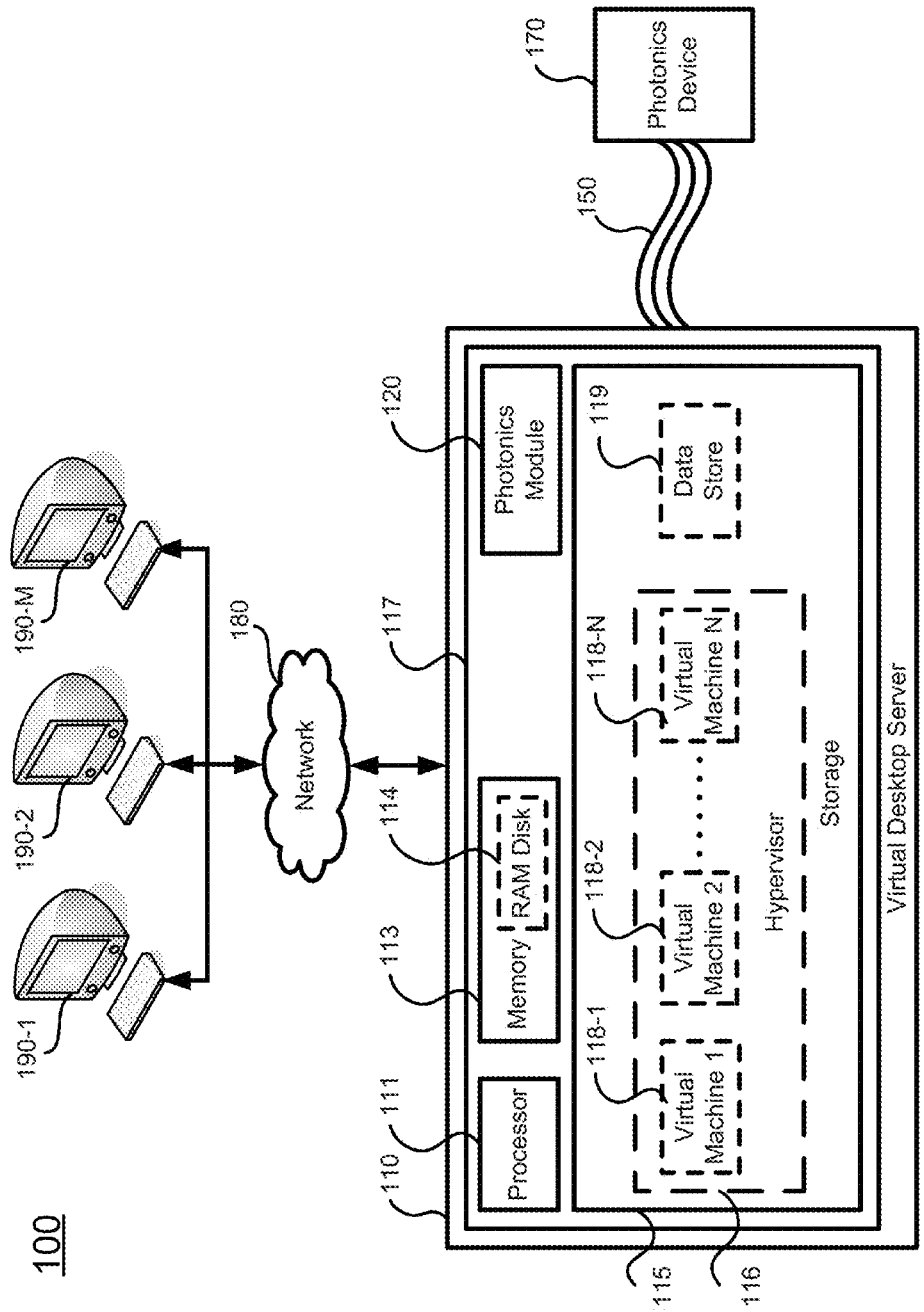
FIG. 1 schematically depicts a system having a virtual desktop server according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-4, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In accordance with the purposes of present disclosure, as embodied and broadly described herein, in certain aspects, the present disclosure relates to a system. FIG. 1 schematically depicts a system having a virtual desktop server according to certain embodiments of the present disclosure. As shown in FIG. 1, the system 100 includes a virtual desktop server 110, a photonics channel 150, at least one photonics device 170, a plurality of computing device 190, and a network 180. The virtual desktop server 110 and the computing devices 190 are communicatively interconnected by the network 180. The network 180 may be a wired or wireless network, and may be of various forms, such as a public network and a private network. Examples of the network 180 may include, but not limited to, a local area network (LAN) or wide area network (WAN) including the Internet. In certain embodiments, two or more different networks 180 may be applied to connect the virtual desktop server 110 and the computing devices 190. The virtual desktop server 110 and the at least one photonics device 170 are communicatively interconnected through the photonics channel 150, or through a network the same as or different from the network 180.

The virtual desktop server 110 is a computing device which serves as a server for providing virtual machine services for the system 100. Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

As shown in FIG. 1, the virtual desktop server 110 may include, but not limited to, a processor 111, a memory 113, storage 115, a chassis 117, a photonics module 120, and other required memory and I/O modules (not shown). In certain embodiments, the processor 111, the memory 113, and the storage 115 may be embedded on the baseboard, or may be connected to the baseboard through at least one interface. Further, the virtual desktop server 110 may include other hardware components and software components (not shown) to perform its corresponding tasks. Examples of these hardware and software components may include, but not limited to, other required memory, interfaces, buses, Input/Output (I/O) modules and peripheral devices.

The processor 111 is a host processor which is configured to control operation of the virtual desktop server 110, and to execute the software applications for the virtual desktop server 110. In certain embodiments, the processor 111 can execute a hypervisor 116 stored in the storage 115. In certain embodiments, the virtual desktop server 110 may run on more than one processor or central processing unit (CPU) as the host processor, such as two CPUs, four CPUs, eight CPUs, or any suitable number of CPUs.

The memory 113 may be a volatile memory, such as the random-access memory (RAM), for storing the data and information during the operation of the virtual desktop server 110. In certain embodiments, the memory 113 is in communication with the processor 111 through a system bus (not shown). In certain embodiments, a portion of the memory 113 is allocated to form a RAM disk 114. The RAM disk 114 is used for hosting the VMs 118 and writing through the data from the VMs 118 to the storage 115. Since the memory 113 is volatile, it requires power to maintain information stored in the RAM disk 114. At certain time, the data in the RAM disk 114 may be written to the storage 115 as permanent records.

The storage 115 may be a non-volatile data storage media for storing the hypervisor 116, a plurality of VMs 118, an operations system (not shown), and other applications of the virtual desktop server 110. Specifically, the storage 115 may store a persistent copy of each of the VMs 118. Examples of the storage 115 may be a magnetic hard disk, an optical disk, a flash memory, a memory card, a USB drive, a floppy disk, or any other types of suitable non-volatile data storage devices. The storage 115 may store the hypervisor 116, the persistent copy of each of the VMs 118, the OS and any other necessary software or firmware components executable at the processor 111. In certain embodiments, the hypervisor, the OS and any other necessary software or firmware components may be implemented as computer executable codes. The storage access time varies widely among these storage devices listed here. For example, the flash memory, the memory cards, the USB drives are much faster than the hard drives, the floppy disks, and the optical drives, often in the ten, hundreds or thousands time. A typical hard drive is capable of up to 80-100 MB/s throughput when new. On the other hand, a one terabyte (TB) flash SSD using a PCI Express ×8 interface, achieved a maximum write speed of 654 megabytes per second (MB/s) and maximum read speed of 712 MB/s. In certain embodiments, the virtual desktop server 110 may not include the storage 115 within its chassis 117. In certain embodiments, the storage 115 may be a storage server or a remote storage disk communicatively connected with the virtual desktop server 110 through the photonics channel 150 or a network.

The chassis 117 is a supporting structure on which the components of the virtual desktop server 110 may be mounted. In certain embodiments, the chassis 117 may be a frame or other internal physical supporting structure on which the circuit boards and other electronics are mounted.

For example, the chassis 117 may be a metal frame. In certain embodiments, the processor 111, the memory 113, the storage 115, and the photonics module 120 are mounted within the chassis 117. In certain embodiments, all the components of the virtual desktop server 110 are located in the chassis 117. In certain embodiments, some components of the virtual desktop server 110, such as a photonics storage, a photonics processor, and a photonics memory may resides out of the chassis 117. In one embodiment, the photonics storage of the virtual desktop server 110 is located remotely from the chassis 117 and is in communication with the components within the chassis 117 through the photonics channel 150.

Referring back to FIG. 1, in certain embodiments, the storage 115 includes the hypervisor 116 and the persistent copy of each of the VMs 118. The virtual desktop server 110 is configured to execute the hypervisor 116, copy each of the VMs 118 from the corresponding persistent copy to the RAM disk 114, and execute VMs 118 at the RAM disk 114 on the executed hypervisor 116. When the hypervisor instance 116 runs on the virtual desktop server 110, the hypervisor 116 emulates a virtual computer machine. A plurality of VMs 118 can operate in the hypervisor 116. Each VM 118 can run a virtual machine operation system (VMOS), such as WINDOWS or LINUX. For brevity, unless otherwise noted, the VM and the VMOS run in that VM are collectively referred to as a VM.

In certain embodiments, the VMs 118 include N virtual machines, which include a first virtual machine 118-1, a second virtual machine 118-2, . . . , and a N-th virtual machine 118-N, where N is a positive integer. In certain embodiments, one or more virtual desktops 110 may be operating on each of the virtual machines 118.

In certain embodiments, the computing devices 190 function as thin clients. Each of the computing devices 190 can be: a desktop computer, a laptop computer, a netbook computer, a notebook computer, a tablet computer, and/or other network connected terminal devices. Each of the computing devices 190 is operated by various users to access one of the virtual desktops 110. In certain embodiments, each of the computing devices 190 is in communication with the virtual desktop server 110 through the network 180. The computing devices 190 includes a first computing device 190-1, a second computing device 190-2, . . . , and a M-th computing device 190-M, where M is a positive integer. In other words, the number of the computing devices 190 is M. In certain embodiments, the number M of the computing devices 190 may be equal to the number N of the virtual machines 118, or may be different from the number N of the virtual machines 118.

In certain embodiments, when the VMs 118 at the RAM disk 114 are executed on the hypervisor 116, the executed virtual machines 118 constantly exchange data with the processor 111. The data exchanged can be divided into two types: a temporary type, and a persistent type. The temporary data need only to be stored in the RAM disk, and the persistent data need to be stored in the non-volatile storage 115. In certain embodiments, write through cache is used to speed up the data access/exchange. Write through is a storage method in which persistent data is written into a cache in the memory 113, and the corresponding non-volatile storage device 115 at the same time. The cached data allows for fast retrieval on demand, while the same data in the non-volatile storage 115 ensures that nothing will get lost if a power failure occurs.

In certain embodiments, in order to improve the throughput of data input and output, a cache such as the RAM disk 114 is used to increase the memory access time. When certain data needs to be stored in the non-volatile storage, the data is first stored in the RAM disk 114, and then an identical copy of the data cached in the RAM disk 114 is stored in the non-volatile storage 115. The processor 111 accesses only the data in the RAM disk 114, instead of accessing the storage 115 such as a hard drive, a solid state drive, or other non-volatile storage devices. The access to the storage 115 takes significantly longer time. Therefore, using the RAM disk 114 saves time, and precious resources of the virtual desktop server 110.

Figure 2:
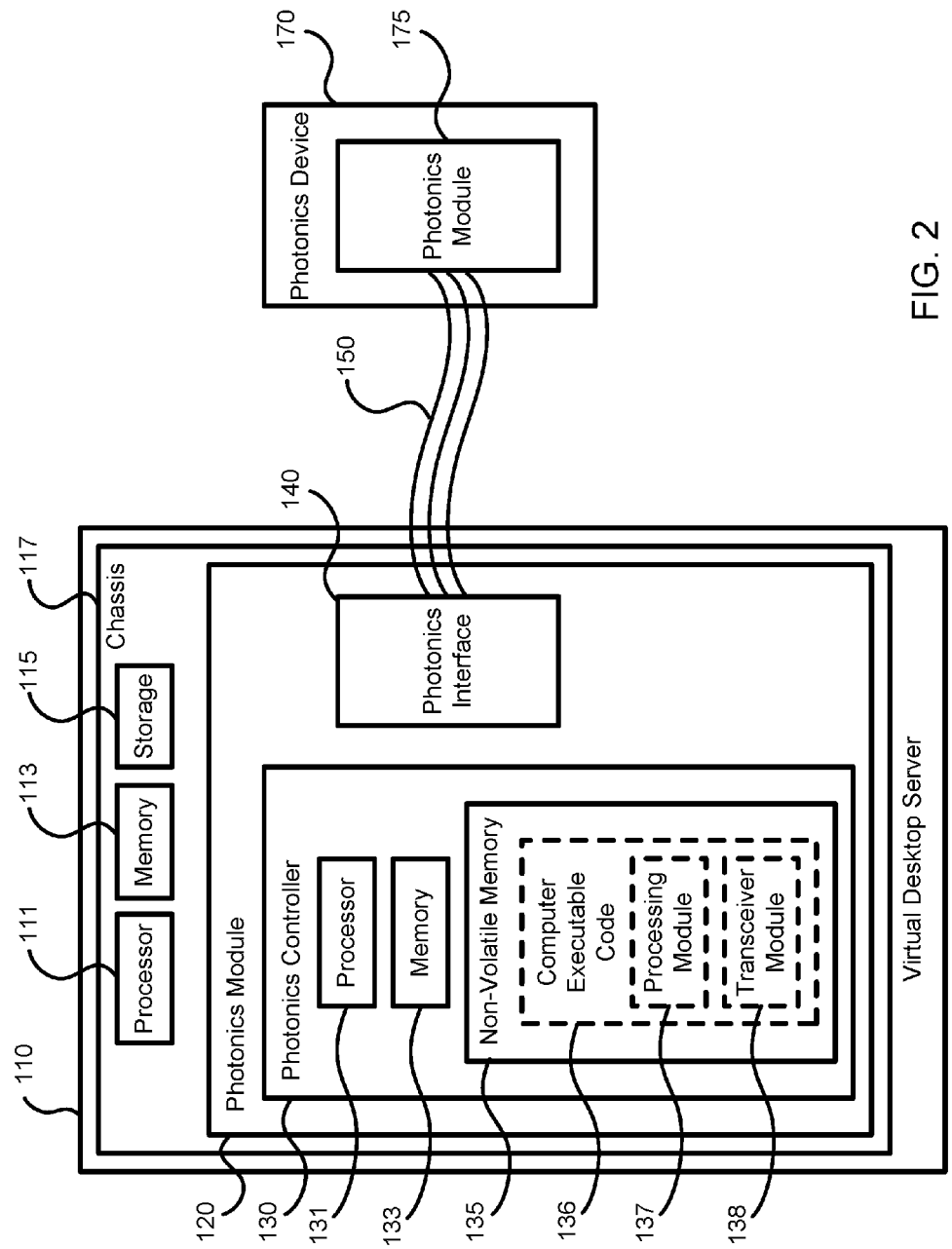
FIG. 2 schematically depicts a system having a virtual desktop server according to certain embodiments of the present disclosure.

The photonics module 120 is a module to perform communication to the at least one photonics device 170 via the photonics channel 150. FIG. 2 schematically depicts a system having a virtual desktop server according to certain embodiments of the present disclosure. Specifically, FIG. 2 shows detailed components of the photonics module 120. As shown in FIG. 2, the photonics module 120 includes a photonics controller 130 and a photonics interface 140. The photonics module 120 is connected to the processor 111 through the photonics interface 140, and connected to the at least one photonics device 170 through the photonics interface 140 via the photonics channel 150.

The photonics controller 130 controls the operation of the photonics interface 140. In certain embodiments, the photonics controller 130 includes a processor 131, a memory 133, and a non-volatile memory 135. In certain embodiments, the photonics controller 130 may include other components. In certain embodiments, the photonics controller 130 may be a physical controller. Alternatively, in certain embodiments, the photonics controller 130 may be a virtual controller implemented by software components, such as a virtual machine. In this case, the components of the photonics controller 130 may be virtual components.

The processor 131 controls operation of the photonics controller 130. In certain embodiments, the processor 131 may be a CPU. The processor 131 may execute the firmware or codes, such as the code 136 stored in the non-volatile memory. In certain embodiments, the photonics controller 130 may run on more than one processor.

The memory 133 can be a volatile memory, such as the RAM, for storing the data and information during the operation of the photonics controller 130.

The non-volatile memory 135 stores the computer executable code 136 for performing the operation of the photonics controller 130. The code 136 of the photonics controller 130 may be implemented as firmware. In certain embodiments, the code may be a program for processing optical signals and electronic signals for the photonics 130. As shown in FIG. 2, the code 136 of the photonics controller 130 includes, among other things, a processing module 137 and a transceiver module 138. In certain embodiments, the transceiver module 138 is configured to receive from and send to the photonics interface 140 electronic signals and optical signals, and the processing module 137 is configured to convert between the electronic signals and optical signals. In certain embodiments, the code 136 may include other necessary modules to perform operations of the photonics controller 130

The photonics interface 140 is a physical hardware interface configured to be communicatively connected to the processor 111 of the virtual desktop server 110, and configured to be communicatively connected to the at least one photonics device 170 via the optical channel 150.

In certain embodiments, the photonics controller 130 and the photonics interface 140 are integrated in a chip to form the photonics module 120. In certain embodiments, the photonics controller 130 and the photonics interface may not locate in one chip, and they are communicatively interconnected.

The photonics channel 150 may be an optical channel formed by one or more optical fibers or other optical medium, which allows photonics signals to be transmitted therethrough. In certain embodiments, the photonics channel 150 may use silicon as the optical medium, and use light (photons) to move huge amounts of data at very high speed with extremely low power. The photonics channel 150 is used for interconnecting the virtual desktop server 110 with the at least one photonics device 170. In certain embodiments, the photonics channel 150 includes at least one cable. Each cable may include up to 64 fibers, and each fiber can support up to 25 Gbps of data transmission. Thus, each cable may support 1.6 Tbps transfer rate. Therefore, the photonics channel 150 is able to transmit optical signals at a high speed.

The photonics device 170 is connected with the virtual desktop server 110 through the photonics channel 150. In certain embodiments, the photonics device 170 may be a component of the virtual desktop server 110. Examples of the photonics device 170 may include at least one of a non-volatile memory, a volatile memory, a storage device, and a graphic processor unit of the virtual desktop server 110. For example, the photonics device 170 may be a volatile memory which functions as the memory 113, or may be a storage device which functions as the storage 115 as described above. In other words, the memory 113 and the storage 115 of the virtual desktop server 110 may be implemented by the photonics device 170. In certain embodiments, when the photonics device 170 is a storage device, the virtual desktop server 110 may only have a small-sized storage 115 or does not have the storage 115 at all, and the virtual desktop server 110 uses the photonics device 170 as an external storage device to store certain VM software, application, operating system, data of the VM users, etc. For example, the photonics device 170 may be a plurality of hard disks, such as a "just a bunch of disks" (JBOD). In certain embodiments, when the photonics device 170 is a volatile memory, the virtual desktop server 110 may only have a small-sized memory 113 or does not have the memory 113 at all, and the virtual desktop server 110 uses the photonics device 170 as the volatile memory for operation of the VM related software or applications. For example, the photonics device 170 may be a plurality of dual in-line memory modules (DIMMS).

Since the photonics device 170 is not confined or limited by the chassis 117 of the virtual desktop server 110, the photonics device 170 may be easily scalable. For example, the chassis 117 may only have limited slots for the storage and memory. By disposing the storage and/or memory as the photonics device 170 out of the chassis 117, the storage and/or memory photonics device 170 of the virtual desktop server 110 is not limited by the size of the chassis 117 or the number of slots in the chassis 117, and additional photonics devices 170 may be added easily. Further, the virtual desktop server 110 within the chassis 117 may communicate with the photonics device 170 of the virtual desktop server 110 out of the chassis 117 at a high speed by using the photonics channel 150.

In certain embodiments, the at least one photonics device 170 includes a server of the system 110. The server 170 is a separate server from the virtual desktop server 110, which may have the similar structure as the virtual desktop server 110 and provide different services for the computing devices 190. For example, the server 170 may be a storage server, a virtual machine server, a memory server, or any other server to provide VDI services usable by the virtual desktop server 110 or the users through the computing devices 190.

Since the photonics channel 150 provides high speed data transmission using photonics signals, a significant amount of functions of the virtual desktop server 110 can be shifted from inside the chassis 117 or local structure of the virtual desktop server 110 to an off-site location or a remote location. For example, the virtual desktop server 110 may locate in one room of a building, and a scalable storage server and/or a scalable memory server may be located in another room of the building. By this type of design, on one hand, the virtual desktop server 110 can be connected to a large number of components, which is not restricted by a limited number of slots available in a chassis. On the other hand, the large number of components located at the photonics device may be easily scalable.

The virtual desktop server 110, the photonics channel 150, and the at least one photonics device 170 may be communicatively connected by a photonics connector. In certain embodiments, as shown in FIG. 2, the photonics connector may be realized as the photonics interface 140.

It should be noted that the chassis 117 as shown in FIGS. 1 and 2 is illustrated as a box, which encloses the components of the virtual desktop server 110, including the processor 111, the memory 113, the storage 115, and the photonics module 120. However, the shape and location of the chassis 117 and the related position of the chassis 117 and the other components of the virtual desktop server 110 may be subject to change, and are not intended be exhaustive or to limit the disclosure.

As discussed above, the photonics interface 140 is a physical hardware interface configured to be communicatively connected to the processor 111 of the virtual desktop server 110, and configured to be communicatively connected to the at least one photonics device 170 via the photonics channel 150. Implementations of the photonics interface 140 may vary. In certain embodiments, the photonics interface 140 may include a signal converter and multiple input/output (I/O) ports and transceivers, where one of the I/O ports and one of the transceivers correspond to the processor 111 of the virtual desktop server 110, and another of the I/O ports and another of the transceivers correspond to the photonics channel 150 (i.e., to the at least one photonics device 170).

Figure 3:
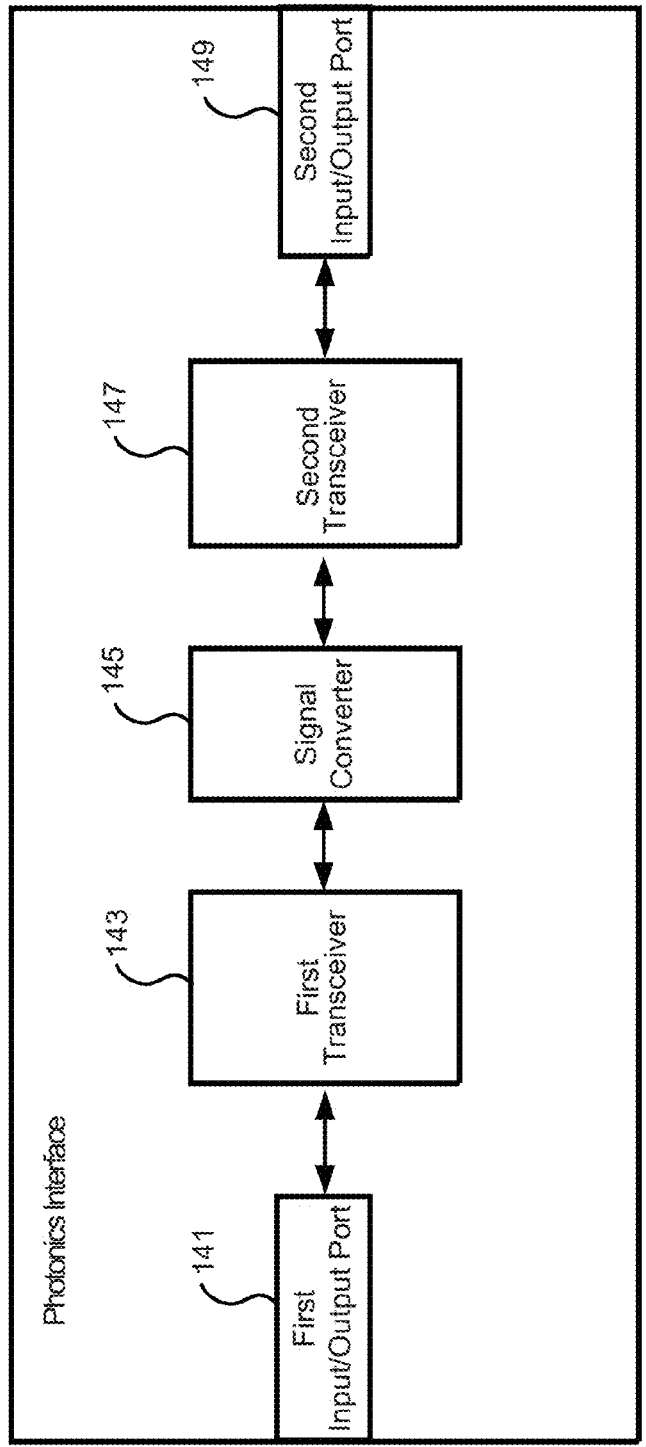
FIG. 3 schematically depicts a photonics interface according to certain embodiments of the present disclosure.

FIG. 3 schematically depicts a photonics interface according to certain embodiments of the present disclosure. As shown in FIG. 3, the photonics interface 140 includes a first I/O port 141, a first transceiver 143, a signal converter 145, a second transceiver 147, and a second I/O port 149. In certain embodiments, the photonics interface 140 may include additional I/O ports and/or transceivers. It should be noted that each of the first I/O port 141 and the second I/O port 149 may be implemented by one single I/O port, or may be implemented by two separate ports respectively functioning as one input port and one output ports. Similarly, each of the first transceiver 143 and the second transceiver 147 may be implemented by one single transceiver, or may be implemented by two separate transmitter/receiver hardware components, each respectively functioning as one transmitter and one receiver. Further, the terms "first" and "second" are merely used to label the components (such as I/O ports and transceivers) as different components, and are not intended to indicate any sequential order or hierarchy of the components.

The first I/O port 141 is an I/O port in charge of the communication to/from the processor 111 of the virtual desktop server 110. As shown in FIG. 3, one end of the first I/O port 141 is connected to the processor 111 of the virtual desktop server 110. The other end of the first I/O port 141 is connected to the first transceiver 143. The first I/O port 141 is configured to receive electronic signals from the processor 111 and send electronic signals to the processor 111. The first I/O port 141 is further configured to receive electronic signals from the first transceiver 143 and send electronic signals to the first transceiver 143. In certain embodiments, the first I/O port 141 may be connected to the processor 111 through a peripheral component interconnect express (PCIe) bus.

The first transceiver 143 controls transmitting and receiving operations of the first I/O port 141. As shown in FIG. 3, one end of the first transceiver 143 is communicatively connected with the first I/O port 141, and the other end of the first transceiver 143 is communicatively connected with the signal converter 145. The first transceiver 143 is configured to receive electronic signals from and send electronic signals to the first I/O port 141 and the signal converter 145.

The signal converter 145 is configured to convert electronic signals to optical signals, and convert optical signals to the electronic signals. In certain embodiments, the optical signals are photonics signals. The signal converter 145 is configured to receive electronic signals from and send electronic signals to the first transceiver 143, and configured to receive photonics signals from and send photonics signals to the second transceiver 147. In certain embodiments, the signal converter 145 may be a hardware disposed in the photonics interface 140. In other embodiments, the signal converter 145 may be realized by performing a part of a software, for example, through the operation of the processing module 137 of the code 136.

In certain embodiments, to transmit and receive photonics signals, the signal converter 145 may include a downstream, passive multiplexer (MUX) and a demultiplexer (DEMUX). The MUX is configured to combine different photonics signals and the associated data in light streams of different wavelengths onto one single light stream, and send the combined light stream to the second transceiver 147 such that the light stream may be delivered through the photonics channel 150. Correspondingly, the DEMUX is configured to collect the light stream passing through the photonics channel 150 by the second transceiver 147, and convert light stream back to different signals.

The second transceiver 147 controls transmitting and receiving operations of the second I/O port 149. As shown in FIG. 3, one end of the second transceiver 147 is communicatively connected with the signal converter 145, and the other end of the second transceiver 147 is communicatively connected with the second I/O port 149. The second transceiver 147 is configured to receive photonics signals and send photonics signals to the second I/O port 149, and configured to receive photonics signals and send photonics signals to the signal converter 145.

The second I/O port 149 is an I/O port in charge of the communication to/from the photonics device 170 via the photonics channel 150. One end of the second I/O port 149 is connected to the second transceiver 147, and the other end of the second I/O port 149 is connected to the at least one photonics device 170. The second I/O port 149 is configured to receive photonics signals from the second transceiver 147 and send the received photonics signals to the photonics device 170 via the photonics channel 150. The second I/O port 149 is further configured to receive photonics signals from the photonics device 170 via the photonics channel 150 and send the received photonics signals to the second transceiver 147. In certain embodiments, the second I/O port 149 may be connected to the photonics channel 150 through a photonics bus.

As discussed above, in certain embodiments, the photonics interface 140 may include additional I/O ports and or additional transceivers. In certain embodiments, for example, an additional third I/O port (not shown) may be provided to be connected to other components of the virtual desktop server 110. Example of the components may include the storage 115, a graphics processing unit (GPU), or any other components of the virtual desktop server 110. The transceiver corresponding to the third I/O port may be an additional transceiver, or may be one of the existing transceiver (e.g., the first transceiver 143 or the second transceiver 147). In this case, the third I/O port is configured to receive electronic signals from the corresponding transceiver, and send the received electronic signals to the corresponding components of the virtual desktop server 110.

In certain embodiments, data communication between the virtual desktop server 110 and the at least one photonics device 170 may be realized by the photonics channel 150. At the virtual desktop server 110, the photonics interface 140 controls the transmitting/receiving operation of the photonics signals. At the photonics device 170, a photonics interface, which is similar to the photonics interface 140, may be provided to control the transmitting/receiving operation of the photonics signals. In this case, the photonic interfaces at both sides are configured to function as a transmitter/receiver pair. In other words, when the photonics interface 140 of the virtual desktop server 110 functions as a transmitter, the photonics interface at the photonics device 170 functions as a corresponding receiver. On the other hand, when the photonics interface at the photonics device 170 functions as a transmitter, the photonics interface 140 of the virtual desktop server 110 functions as a corresponding receiver. In this case, at the photonics interface functioning as the transmitter, the operation generally includes: generating light at distinct wavelengths; transforming electronic signals to photonics signals; multiplexing photonics channels onto one single fiber; and separating photonics channels. On the other hand, at the photonics interface functioning as the receiver, the operation generally includes: detecting photons for the photonics signals; and converting the received photonics signals back to the electronic signals.

Figure 4A:
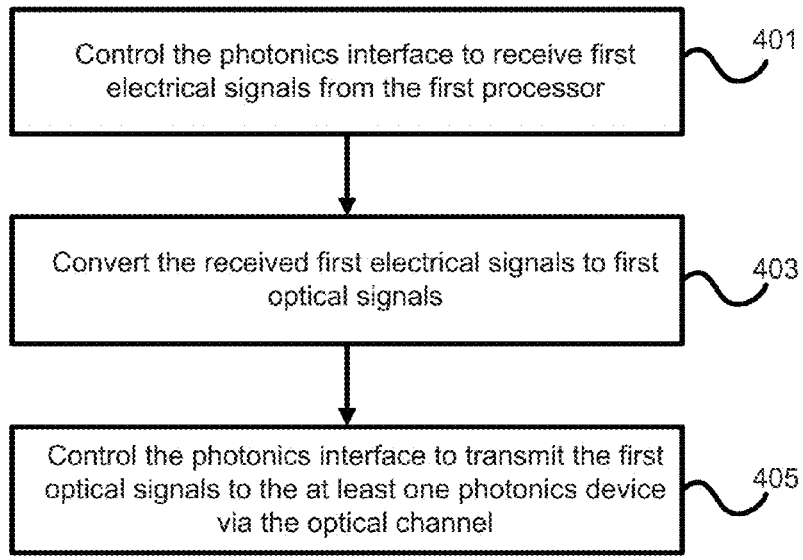
FIG. 4A depicts a flowchart showing operation of a photonics controller as a transmitter according to certain embodiments of the present disclosure.
Figure 4B:
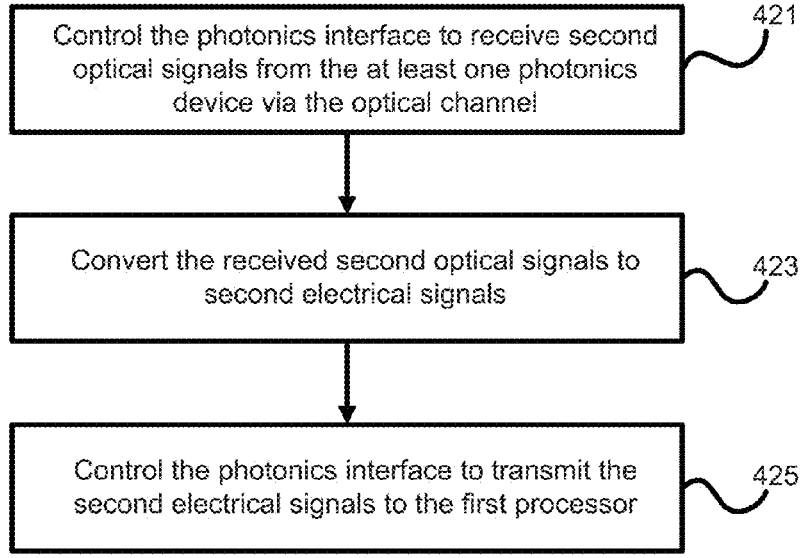
FIG. 4B depicts a flowchart showing operation of a photonics controller as a receiver according to certain embodiments of the present disclosure.

In certain aspects, the disclosure related to a method. FIGS. 4A and 4B respectively depict two flowcharts showing operation of a photonics controller according to certain embodiments of the present disclosure, where FIG. 4A shows the operation of the photonics controller as a transmitter, and FIG. 4B shows the operation of the photonics controller as a receiver. In certain embodiments, the method 400 and 420 as described in FIGS. 4A and 4B may be implemented by the system 100 as shown in FIGS. 1-3.

Referring to FIG. 4A, at operation 401, when the processor 111 needs to communicate with the at least one photonics device 170, the processor 111 of the virtual desktop server 110 sends first electronic signals to the first I/O port 141 of the photonics interface 140. Then the first transceiver 143 receives the first electronic signals from the first I/O port 141, and transmits the first electronics signals to the signal converter 145. The first electronics signals may relate to data of VM users, VM software, application, operating system, data of the VM users, etc.

Upon receiving the first electronic signals, at operation 403, the signal converter 145 converts the received first electronic signals to first optical signals. In certain embodiments, the conversion between the first electronic signals and the first optical signals may be accomplished by a hardware configuration. In certain embodiments, the conversion between the first electronic signals and the first optical signals may be accomplished by performing the code 136 at the processor 131 of the photonics controller 130.

At operation 405, the signal converter 145 sends the first optical signals to the second transceiver 147, the second transceiver transmit the received first optical signals to the second I/O port 149, and the first optical signals are then sent from the second I/O port 149 to the at least one photonics device 170 via the photonics channel 150.

It should be particularly noted that the operations 401 and 405, although listed in sequence as shown in FIG. 4A, may be performed in a different order. In certain embodiments, the operation 401 and 405 may be performed during the operation 403. In certain embodiments, the operations 401-405 may be performed at the same time.

Further, during the processing of the received first electronic signals, at operations 401-405, the photonics interface 140 determines one of the photonics devices 170 as a destination. In certain embodiments, the photonics interface 140 identifies the one of the photonics devices 170 by the information stored in the first electronic signals.

Referring to FIG. 4B, at operation 421, the at least one photonics device 170 sends second optical signals to the photonics interface 140 via the optical channel 150. In certain embodiments, the sending of the second optical signals is in response to the receiving of the first optical signals. In certain embodiments, the second optical signals include information of the destination of the second optical signals. In one embodiment, the destination of the second optical signals is the processor 111 of the virtual desktop server 110. In other embodiments, the second optical signals may be sent independently from the receiving of the first optical signals. The second optical signals transmit via the optical channel 150, the second I/O port 149, and the second transceiver 147 to the signal converter 145.

Upon receiving the second optical signals, at operation 423, the signal converter 145 converts the received second optical signals to second electronic signals. In certain embodiments, the conversion between the second optical signals and the second electronic signals may be accomplished by a hardware configuration. In certain embodiments, the conversion between the first electronic signals and the first optical signals may be accomplished by performing the code 136 at the processor 131.

At operation 425, the signal converter 145 sends the second electronic signals to the processor 111 of the virtual desktop server 110. The process may include the signal converter 145 sends the second optical signals to the first transceiver 142, the first transceiver transmits the received second optical signals to the first I/O port 141, and the first I/O port 141 sends the second optical signals to the processor 111 of the virtual desktop server 110.

In certain embodiments, the photonics interface 140 may not include the first I/O port 141, the first transceiver 143, the signal converter 145, the second transceiver 147, and the second I/O port 149, as long as the photonics interface 140 is configured to receive electronic signals, optical signals, and convert between the electronic signals and the optical signals. In certain embodiments, the photonics interface 140 accomplishes its function by hardware configuration or by running a code.

By the communication between the virtual desktop server 110 and the photonics device 170 via the photonics channel 150 at a high speed data transmission, the resource of the photonics device 170, which may be a photonics storage device or a photonics memory device, may be used by the desktop server 110, so that the virtual desktop server 110 can have a scalable computing power, storage space or other features when comparing with a virtual desktop server without high speed data transmission means.

In certain embodiments, the operations 401-405 as shown in FIG. 4A and the operations 421-425 as shown in FIG. 4B may be independent. In certain embodiments, the operations 401-405 may be resulting in response to the operations 421-425, or the operations 421-425 may be resulting in response to the operations 401-405.

In certain embodiments, before any of the operations 401-405 as shown in FIG. 4A or the operations 421-425 as shown in FIG. 4B, the virtual desktop server 110 may include an initialization step, to configure the communication standard between the virtual desktop server 110 and the photonics device 170 via the photonics channel 150. For example, specific connectors or photonics interfaces 140 and 175 may be defined during the initialization operation.

In addition, when the virtual desktop server 110 has an allocated data store in the storage (the storage 115 may be located within the chassis 117 or at the photonics device 170) for preserving data from a plurality of virtual machines (VMs), and has an allocated RAM disk in the memory (the memory 113 may be located within the chassis 117 or at the photonics device 170) for hosting the VMs and writing through the data from the plurality of VMs to the data store, the execution of the hypervisor 116 and the execution of the VMs 118 on the executed hypervisor 116 may be significantly fast.

In certain aspects, the present disclosure is related to a non-transitory computer readable medium storing computer executable code. The code, when executed at one or more processer of a photonics controller 130, may perform the method as described above. In certain embodiments, the non-transitory computer readable medium may include, but not limited to, the non-volatile memory 133 as described above, or any other non-transitory storage media of the photonics controller 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising:
   a virtual desktop server, comprising:
      a first processor; and
      a photonics module, comprising:
         a photonics interface, configured to be electronically connected to the first processor, and to be connected to at least one photonics device via an optical channel; and a photonics controller comprising a second processor and a non-volatile memory storing first computer executable code, wherein the first computer executable code, when executed at the second processor, is configured to:

control the photonics interface to receive first electronic signals from the first processor;

convert the received first electronic signals to first optical signals;

control the photonics interface to transmit the first optical signals to the at least one photonics device via the optical channel;

control the photonics interface to receive second optical signals from the at least one photonics device via the optical channel;

convert the received second optical signals to second electronic signals; and control the photonics interface to transmit the second electronic signals to the first processor.

2. The system of claim 1, wherein the first computer executable code comprises:

a processing module configured to convert the received first electronic signals to the first optical signals and convert the received second optical signals to the second electronic signals; and a transceiver module configured to control the photonics interface to receive the first electronic signals from the first processor, to receive the second optical signals from the at least one photonics device via the optical channel, to transmit the first optical signals to the at least one photonics device via the optical channel, and to transmit the second electronic signals to the first processor.

3. The system of claim 1, wherein the photonics module is a chip having the photonics interface and the photonics controller integrated therein.

4. The system of claim 1, wherein the photonics interface is electronically connected to the first processor through a peripheral component interconnect express (PCIe) bus.

5. The system of claim 1, wherein the optical channel comprises at least one photonics channel, and the photonics interface is electronically connected to the at least one photonics channel through a photonics bus.

6. The system of claim 1, wherein the photonics interface comprises:

a first input/output (I/O) port electronically connected with the first processor;

a second I/O port connected with the at least one photonics device;

a first transceiver connected with the first I/O port, configured to receive the first electronic signals from and transmit the second electronic signals to the first processor via the first I/O port;

a second transceiver connected with the second I/O port, configured to receive the second optical signals from and transmit the first optical signals to the at least one photonics device via the optical channel; and a signal converter connected between the first transceiver and the second transceiver, configured to convert the first electronic signals received from the first transceiver to the first optical signals and convert the second optical signals received from the second transceiver to the second electronic signals.

7. The system of claim 1, wherein the virtual desktop server further comprises a chassis, the first processor and the photonics module are physically disposed in the chassis, and the at least one photonics device is physically disposed outside the chassis.

8. The system of claim 1, wherein the at least one photonics device comprises a server of the system.

9. The system of claim 1, wherein the virtual desktop server further comprises a memory and a storage storing second computer executable code, and the second computer executable code, when executed at the first processor, is configured to:

allocate a portion of the storage to create a data store for preserving data from a plurality of virtual machines (VMs); and allocate a portion of the memory to create a random access memory (RAM) disk for hosting the plurality of VMs and writing through the data from the plurality of VMs to the data store.

10. The system of claim 7, wherein the at least one photonics device comprises at least one of a non-volatile memory, a volatile memory, a storage device, and a graphic processor unit of the virtual desktop server.

11. The system of claim 9, wherein the storage of the virtual desktop server further stores a hypervisor and a persistent copy of the plurality of VMs, wherein the virtual desktop server is configured to:

execute the hypervisor;

copy the VMs from the persistent copy to the RAM disk; and execute the VMs at the RAM disk on the executed hypervisor, wherein each of the executed VMs is configured to provide one or more virtual desktops accessible for a plurality of computing devices functioning as a plurality of thin clients.

12. A method for providing a virtual desktop infrastructure (VDI) system using photonics, comprising:

controlling, by a photonics controller of a virtual desktop server, a photonics interface of the virtual desktop server to receive first electronic signals from a first processor of the virtual desktop server, wherein the photonics interface is configured to be electronically connected to the first processor and at least one photonics device via an optical channel;

converting, by the photonics controller, the received first electronic signals to first optical signals;

controlling, by the photonics controller, the photonics interface to transmit the first optical signals to the at least one photonics device via the optical channel;

controlling, by the photonics controller, the photonics interface to receive second optical signals from the at least one photonics device via the optical channel;

converting, by the photonics controller, the received second optical signals to second electronic signals; and controlling, by the photonics controller, the photonics interface to transmit the second electronic signals to the first processor.

13. The method of claim 12, wherein the virtual desktop server comprises a photonics module, and wherein the photonics module is a chip having the photonics interface and the photonics controller integrated therein.

14. The method of claim 12, wherein the photonics interface is electronically connected to the first processor through a peripheral component interconnect express (PCIe) bus.

15. The method of claim 12, wherein the optical channel is at least one photonics channel, and the photonics interface is electronically connected to the at least one photonics channel through a photonics bus.

16. The method of claim 12, wherein the photonics interface comprises:
   a first input/output (I/O) port electronically connected with the first processor;
   a second I/O port connected with the at least one photonics device;
   a first transceiver connected with the first I/O port, configured to receive the first electronic signals from and transmit the second electronic signals to the first processor via the first I/O port;
   a second transceiver connected with the second I/O port, configured to receive the second optical signals from and transmit the first optical signals to the at least one photonics device via the optical channel; and
   a signal converter connected between the first transceiver and the second transceiver, configured to convert the first electronic signals received from the first transceiver to the first optical signals and convert the second optical signals received from the second transceiver to the second electronic signals.

17. The method of claim 12, wherein the virtual desktop server further comprises a chassis, the first processor and the photonics module are physically disposed in the chassis, and the at least one photonics device is physically disposed outside the chassis.

18. The method of claim 17, wherein the at least one photonics device comprises at least one of a non-volatile memory, a volatile memory, a storage device, and a graphic processor unit of the virtual desktop server.

19. The method of claim 13, wherein the at least one photonics device comprises a server of the system.

20. A non-transitory computer readable medium storing computer executable code, wherein the code, when executed at a processor of a photonics controller of a virtual desktop server of a system, is configured to:
   control a photonics interface of the virtual desktop server to receive first electronic signals from a processor of the virtual desktop server, wherein the photonics interface is configured to be connected to the processor of the virtual desktop server and at least one photonics device via an optical channel;
   convert the received first electronic signals to first optical signals;
   control the photonics interface to transmit the first optical signals to the at least one photonics device via the optical channel;
   control the photonics interface to receive second optical signals from the at least one photonics device via the optical channel;
   convert the received second optical signals to second electronic signals; and
   control the photonics interface to transmit the second electronic signals to the processor of the virtual desktop server.

21. The non-transitory computer readable medium of claim 20, wherein the virtual desktop server comprises a photonics module, and wherein the photonics module is a chip having the photonics interface and the photonics controller integrated therein.

22. The non-transitory computer readable medium of claim 20, wherein the photonics interface is electronically connected to the processor of the virtual desktop server through a peripheral component interconnect express (PCIe) bus.

23. The non-transitory computer readable medium of claim 20, wherein the optical channel is at least one photonics channel, and the photonics interface is electronically connected to the at least one photonics channel through a photonics bus.

24. The non-transitory computer readable medium of claim 20, wherein the photonics interface comprises:
   a first input/output (I/O) port electronically connected with the processor of the virtual desktop server;
   a second I/O port connected with the at least one photonics device;
   a first transceiver connected with the first I/O port, configured to receive the first electronic signals from and transmit the second electronic signals to the processor of the virtual desktop server via the first I/O port;
   a second transceiver connected with the second I/O port, configured to receive the second optical signals from and transmit the first optical signals to the at least one photonics device via the optical channel; and
   a signal converter connected between the first transceiver and the second transceiver, configured to convert the first electronic signals received from the first transceiver to the first optical signals and convert the second optical signals received from the second transceiver to the second electronic signals.

25. The non-transitory computer readable medium of claim 21, wherein the virtual desktop server further comprises a chassis, the processor of the virtual desktop server and the photonics module are physically disposed in the chassis, and the at least one photonics device is physically disposed outside the chassis.

26. The non-transitory computer readable medium of claim 21, wherein the at least one photonics device comprises a server of the system.

27. The non-transitory computer readable medium of claim 25, wherein the at least one photonics device comprises at least one of a non-volatile memory, a volatile memory, a storage device, and a graphic processor unit of the virtual desktop server.

* * * * *